United States Patent
Jursich et al.

(10) Patent No.: US 6,543,493 B2
(45) Date of Patent: Apr. 8, 2003

(54) OPTICAL MONITORING PROCESSES AND APPARATUS FOR COMBINED LIQUID LEVEL SENSING AND QUALITY CONTROL

(75) Inventors: Gregory M. Jursich, Clarendon Hills, IL (US); Kevin Sirk, Chicago, IL (US)

(73) Assignees: L'Air Liquide - Societe'Anonyme a' Directoire et Conseil de Surveillance pour l'Etude et l'Exploitation des Procedes Georges Claude, Paris (FR); American Air Liquide, Inc., Fremont, CA (US)

(*) Notice: Subject to any disclaimer, the term of this patent is extended or adjusted under 35 U.S.C. 154(b) by 0 days.

(21) Appl. No.: 09/905,598

(22) Filed: Jul. 13, 2001

(65) Prior Publication Data

US 2003/0010396 A1 Jan. 16, 2003

(51) Int. Cl.$^7$ .......................... B65B 1/30; B65B 31/00; B67C 3/02
(52) U.S. Cl. .................. 141/95; 141/21; 141/63; 141/67; 141/94; 141/198; 137/93; 73/64.43
(58) Field of Search .................. 141/1, 8, 21, 48, 141/63, 89, 91, 94, 95, 98, 67, 198; 137/208, 209, 412, 93; 73/308, 311, 313, 319, DIG. 5, 64.43, 61.48

(56) References Cited

U.S. PATENT DOCUMENTS

| | | | | |
|---|---|---|---|---|
| 4,859,375 A | * | 8/1989 | Lipisko et al. | 137/209 |
| 5,038,840 A | * | 8/1991 | Fair | 137/386 |
| 5,046,925 A | | 9/1991 | Fletcher | |
| 5,465,766 A | | 11/1995 | Siegele et al. | |
| 5,562,132 A | | 10/1996 | Siegele et al. | |
| 5,607,002 A | | 3/1997 | Siegele et al. | |
| 5,652,431 A | | 7/1997 | DeSisto et al. | |
| 5,711,354 A | | 1/1998 | Siegele et al. | |
| 5,878,793 A | | 3/1999 | Siegele et al. | |

OTHER PUBLICATIONS

Zorich, Bob, "Monitoring Liquid Chemical Levels," *Semiconductor, International*, pp. 327–336, Jul. 1997.

* cited by examiner

*Primary Examiner*—Timothy L. Maust
(74) *Attorney, Agent, or Firm*—Linda K. Russell

(57) ABSTRACT

An apparatus of measuring both concentration and amount of a liquid in a liquid chemical container is presented, comprising viewing light emanating from a first optical member that is in visual contact with the liquid, the light emanating from the optical member having a level indicating quality; and routing light from a second optical member that is in visual contact with the liquid to means for optical discrimination between liquid chemical based on different optical properties.

10 Claims, 2 Drawing Sheets

OPTICAL MONITORING PROCESSES AND APPARATUS FOR COMBINED LIQUID LEVEL SENSING AND QUALITY CONTROL

BACKGROUND OF THE INVENTION

1. Field of the Invention

This invention relates generally to liquid level detection, and more specifically to optical liquid level detection, wherein quality of the liquid chemical is also determined.

2. Related Art

There are many processes involving liquid chemicals which require consistent and reliable delivery of liquid chemicals with very high purity. In the semiconductor manufacturing industry, for example, reliable delivery of high purity liquids to the process chamber is critical to the overall operation. Catastrophic process events can occur, for example, if liquid levels in canisters or ampoules are not monitored accurately. To make matters worse, many semiconductor manufacturing processes involve very expensive chemicals which have significant health hazards associated with them. These factors require good utilization of the chemical involved along with minimal waste. As a result, there is a need for reliable level sensing of liquid source and intermediate containers in process chemical delivery systems.

Such need for reliable level sensing has been addressed satisfactorily by a number of ways. A simple but reliable float sensor with magnetically activated electromechanical switches can be strategically placed inside the container so as to provide electrical setpoint signals when the liquid level reaches predetermined levels in the container. This concept of reliable level sensing of multiple setpoints can be expanded to any type of reliable level sensor that is internal to the container. Alternatively, with simple implementation and quantitative measure, a weighing scale can be placed under a container in order to monitor amount of liquid in any container. There are also numerous other liquid level sensing devices such as ultrasonic and capacitance. All these liquid level sensing devices are readily available commercially (for example see Zorrich, Bob "Monitoring Liquid Chemical Levels", Semiconductor International, July 1997, pages 327–336.)

Another means of liquid level sensing are optical methods. For example Fletcher (U.S. Pat. No. 5,046,925) teaches the art of utilizing Bragg optical diffraction phenomenon to sense the presence of liquid at the point of sensing. Although by description this is basically a one-position sensor, theoretically multiple sensors can be cleverly positioned so as to track liquid level within limits. Further, unlike many electrical monitoring based sensors, optical and ultrasonic sensors are less intrusive to chemicals themselves, and are least likely to induce chemical degradation. This is a particularly important point in the semiconductor industry where many process chemicals are very active and hence prone to chemical degradation. Such degradation cannot be tolerated in critical semiconductor manufacturing steps because extremely high purity chemicals are required.

Another, yet more simple, optical approach to level sensing is to use optical transmission and/or reflection phenomenon at the end of light transmission fibers in order to determine if liquid is present or not. As with Bragg diffraction, this technique is again one position level determination. But here, there is the added advantage of more easily scaling up to multiple position monitoring. Unlike the diffraction method, no critical optical alignment is required. Such method has been successfully established on numerous liquid delivery systems sold to the semiconductor industry. In these cases, the fibers are positioned along the side of the container with light propagation horizontal to the liquid level.

As has been noted by one inventor (U.S. Pat. No. 5,652,431) the optical spectral transmission properties of many chemical reagents used in the semiconductor industry is a useful and inexpensive means of evaluating concentration of the chemical reagents in the process delivery line, and as noted in such patents many organometallic reagents for chemical vapor deposition exhibits strong color properties which can be used to determine the concentration in a delivery process line.

It would be an advance in the art of chemical delivery if both level and chemical purity of chemical in a container could be determined using an optical means.

SUMMARY OF THE INVENTION

In accordance with the present invention, optical means may be used both to determine liquid level and purity of chemical in a container. This technique takes advantage of properties of some liquid chemicals, such as organometallic precursor chemicals, which tend to change optical properties, such as color, turbidity, and the like, due to impurities and chemical degradation over time. Using the methods and apparatus of the present invention, these features of the chemicals are used to monitor quality of chemical by using an inexpensive fiber optic spectrometer to monitor purity of the chemical.

In accordance with a first aspect of the invention, a method of measuring both concentration and amount of a liquid in a liquid chemical container is presented, the method comprising the steps of:

(a) viewing light emanating from a first optical member that is in visual contact with the liquid, the light emanating from the first optical member having a level indicating quality; and (b) routing light from a second optical member that is in visual contact with the liquid to means for optical discrimination between liquid chemical based on different optical properties.

Preferred methods are those wherein the first optical member and the second optical member are one and the same member; methods wherein the first optical member and the second optical member are separate members; and methods wherein the viewing step comprises human vision. Also preferred are methods wherein the viewing step comprises machine vision. Further preferred are methods including use of a single light source to generate light which enters the first optical member and the second optical member; methods wherein multiple first optical members are installed in the walls of the liquid chemical containers; methods wherein the means to discriminate is a spectrometer, methods wherein the means to discriminate is human vision; and methods wherein the means to discriminate is a turbidity monitor. Preferably, the optical property is color or turbidity.

A second aspect of the invention is a liquid chemical container apparatus for dispensing liquid chemical, the apparatus allowing measurement of both concentration and amount of a liquid chemical in the liquid chemical container, the apparatus comprising:

(a) a container body having an optical member optically connected (in other words arranged so that the optical member has optical access) to the container body, the optical member having a distal end and a proximal end, the distal end adapted to extend into the liquid chemical contained in the container body;

(b) a light source optically connected to the optical member, the light source able to transmit light through the optical member;

(c) a light receptor optically connected to the optical member, the light receptor able to receive light reflected from the liquid chemical, the light reflected from the liquid chemical being transmitted through the optical member; and (d) means for optical discrimination between liquid chemical of different optical properties, the means for optical discrimination optically connected to the optical member.

Preferred are those apparatus wherein the optical member is an optical fiber transmission/reflection probe; apparatus wherein the means for optical discrimination is selected from the group consisting of human vision and machine vision; apparatus wherein the machine vision is a spectrometer; and apparatus wherein the optical property is color or turbidity.

A third aspect of the invention is an apparatus for dispensing liquid chemical, the apparatus allowing measurement of both concentration and amount of a liquid chemical in the liquid chemical container, the apparatus comprising:

(a) a container body having a plurality of optical members connected to the container body, the plurality of optical members allowing optical access to liquid chemical contained within the container body, the plurality of optical members positioned on the container body in a fashion so that a user may determine the presence or absence of the liquid chemical at the points where each of the plurality of optical members is positioned; and (b) means for optical discrimination between liquid chemical of different optical properties, the means for optical discrimination connected to at least one of the plurality of optical members. Preferred are apparatus wherein the means for optical discrimination is selected from a group consisting of human vision and machine vision, particularly wherein the machine vision is a spectrometer.

A fourth aspect of the invention is a liquid chemical container apparatus for dispensing liquid chemical, the apparatus allowing measurement of both concentration and amount of a liquid chemical in the liquid chemical container, the apparatus comprising:

(a) an optical member optically connected to the container body, the optical member having a distal end and a proximal end, the distal end adapted to extend into the container body but not touch liquid chemical contained in the container body;

(b) a light source optically connected to the optical member, the light source able to transmit light through the optical member;

(c) a light receptor optically connected to the optical member, the light receptor able to receive light reflected from the liquid chemical, the light reflected from the liquid chemical being transmitted through the optical member; and (d) means for optical discrimination between liquid chemical of different optical properties, the means for optical discrimination optically connected to the optical member. Preferred are those apparatus within this aspect of the invention wherein the means for optical discrimination is selected from the group consisting of human vision and machine vision; especially apparatus wherein the machine vision is a spectrometer.

It is known that certain liquid chemicals, such as transition metal-amino and metal-alkoxide complexes, exhibit a difference in color and/or turbidity depending on purity and age of the chemical in storage and can form particulate matter in the presence of moisture or other contaminants. In the present invention, optical transmission/reflection phenomenon are monitored by means of simple fiber optics so that special properties can be monitored in order to evaluate purity of chemical, and such purity analysis can be incorporated into existing fiber optics often used to monitor liquid level in containers.

Many organometallic compounds used in chemical vapor deposition are reactive in nature and are difficult to obtain in pure form commercially. For example, three commercial samples of tetrakisdiethylamino zirconium can have three distinct shades of brown, depending on their age. In chemical vapor deposition processes, it is advantageous if the liquid chemicals are easily degraded at lower process temperatures; however, this leads to the use of less thermally stable compounds. The ultraviolet and visible spectral features of such compounds are typically affected by impurities present in the sample. It is known that some chemicals, for example hafnium t-butoxide, change color over time during storage due to their reactive nature (as disclosed in Material Safety Data sheet from InorgTech dated Oct. 7, 2000.) Furthermore, such compounds react with trace moisture and numerous other sources of oxides to form insoluble metal oxides that become suspended in the liquid causing the liquid to become turbid. This turbidity can also be monitored optically with fiber optics. Thus, in situ monitoring of these chemicals, such as with fiber optics then provides a convenient means of monitoring quality of liquid chemical to be used in critical processes, such as semiconductor manufacturing. At the same time, such optical monitoring can be used to monitor two or more critical parameters in liquid chemical delivery: liquid level in a container, liquid purity in the container, color of liquid chemical in the container, and change of any of these parameters.

Further understanding of the invention will be ascertained upon review of the following brief description of the drawing figures and description of preferred embodiments. The drawing figures are not to scale and are merely meant to be illustrative of the apparatus and methods of the invention.

DESCRIPTION OF PREFERRED EMBODIMENTS

In one embodiment of the present invention, optical transmission/reflection phenomenon are monitored by means of simple fiber optics. Such coupling of fiber optics to chemical canisters has been done before, but only for monitoring liquid level. In accordance with the present invention, by examining spectral profiles of light transmitted or reflected by the chemical, one can assess the purity of the liquid chemical inside the container by the presence or absence of impurities, as impurities will typically change (for example, darken) the color of the liquid chemical, or other optical properties.

In a second embodiment, use of optical monitoring "level sensing" fibers that extend out of the sides of the liquid chemical container are used to monitor both intensity for liquid level, as in the present design, and also spectral profile for chemical color or turbidity characteristics for quality/purity information.

A third embodiment employs a single optical feed through connection, preferably made on or near the top of the container, and light propagation directed perpendicularly to the liquid surface. Using more sophisticated spectral interpretation of light from the fibers, both liquid level and chemical purity can be assessed. Such installation minimizes manufacturing costs as well as limits the number of container seals required, thereby reducing potential sites for leaks and chemical degradation from sealing materials required in the optical connections to the container.

Figure 1:
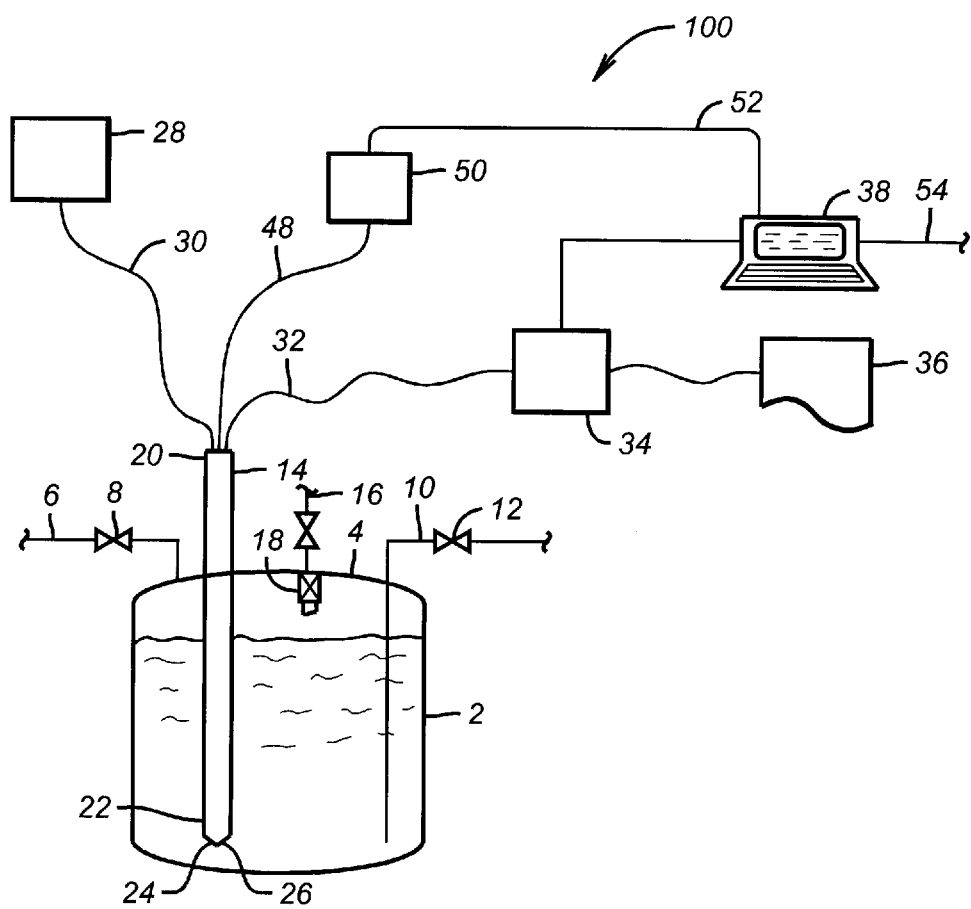
FIG. 1 illustrates, in schematic side-cross-section, one preferred container embodiment of the invention.

Referring now to the drawing figures, FIG. 1 illustrates a first embodiment 100 of an apparatus in accordance with the invention. Apparatus 100 includes a container 2 having a container top 4, a liquid inlet conduit 6 and control valve 8, and a liquid chemical outlet conduit 10 and control valve 12. Present is an optical element 14, an optional gas inlet 16 with gas filter 18, gas filter 18 preferably comprising gas filter media such as alumina, silica and aluminosilicates, as described in assignees' copending application Ser. No. 09/905,327, filed Jul 13, 2001 on even date herewith, and incorporated by reference herein. Optical member 14 has a proximal end 20 and a distal end 22, distal end 22 preferably having a pair of facets or faces 24 and 26. A light source 28 is connected via an optical transmitter, such as an optical fiber 30 which connects light source 28 with optical member 14 at its distal end 20. Another optical fiber connects optical member 14 at its distal end 20 to a spectrometer 34. Spectrometer 34 is preferably connected to a printing device 36 which might print a report, and/or to a computer 38.

Figure 1A:
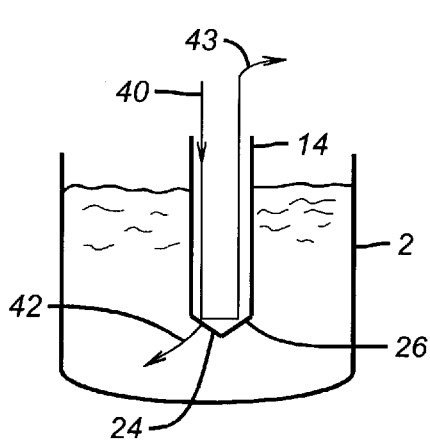
Figure 1B:
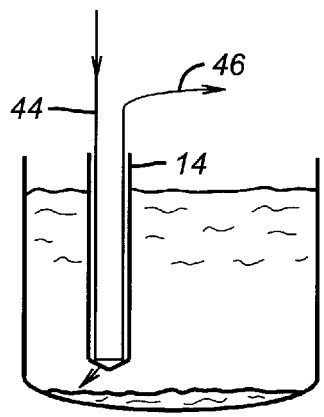

Referring now to FIGS. 1A and 1B, the functions of optical member 14 and its construction will be described. A light ray 40 entering optical member 14, will reach facet 24, producing a light ray 42 as depicted in FIG. 1 A. In other words, very little of the light ray 40 will be reflected back towards the light source 28. This information of course is important in determining the presence or absence of liquid chemical within container 2. A light ray 43 may emanate from facet 26 and traverse in the opposite direction as light ray 40 through optical member 14, and exit through an optical fiber 48 (FIG. 1) and into a light receptor 50. Light receptor 50 is able to tell the presence or absence of liquid in container 2. Simultaneously, light ray 43 or a separate light ray emanating from optical member 14 is fed through optical fiber 32 into spectrometer 34, and the concentration of liquid chemical thus determined by spectroscopic analysis. It is also possible that spectrometer 34 could be replaced by human vision.

FIG. 1B illustrates the situation when liquid level drops below the level of the facets 24 and 26 of optical member 14. In this case an incoming light ray 44 is substantially totally reflected by facets 24 and 26 and thus exits light member 14 as light ray 46. Light ray 46 is much more intense than light ray 43 of FIG. 1A, and is routed via optical fiber 48 to optical receptor 50. Further, either ray 46 or a separate light ray (not shown) in FIG. 1B is fed through optical fiber 32 to spectrometer 34.

Thus the apparatus of FIGS. 1, 1A, and 1B is able to simultaneously determine liquid level and concentration of liquid chemical in container 2. This information of course can be fed to computer 38 and one or more outputs 54 may be used to monitor and/or control, for example, addition of liquid chemical to container 2, or withdrawal of liquid from container 2.

Figure 2:
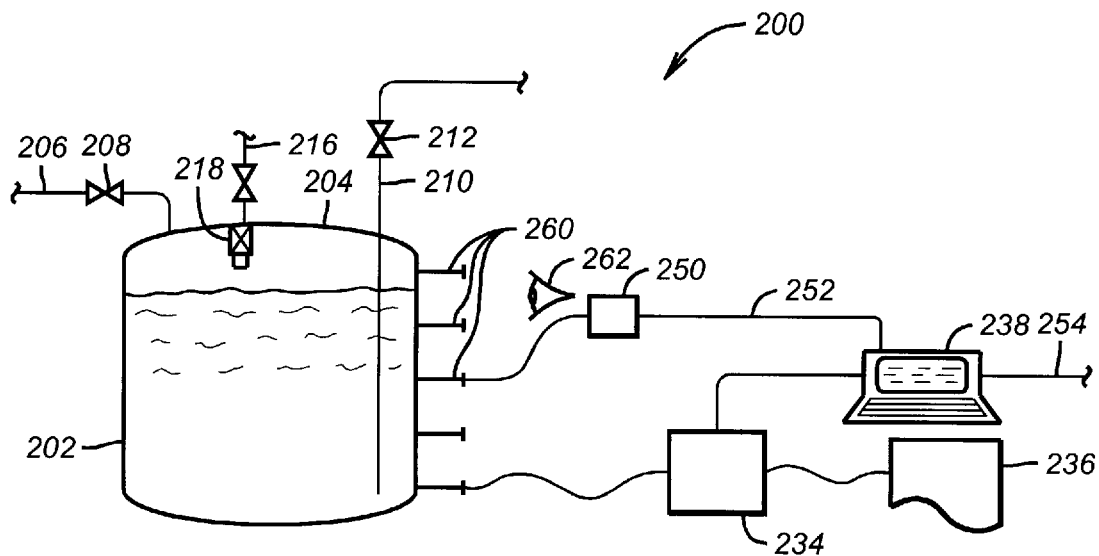
FIG. 2 illustrates, in schematic side-cross-section, a second preferred container embodiment of the invention.

FIG. 2 illustrates a second embodiment 200 of liquid chemical container in accordance with the invention. Embodiment 200 comprises a container 202 having a top 204, a liquid inlet 206 and liquid inlet control valve 208. Also present is a liquid discharge conduit 210 and liquid discharge control valve 212. Optionally, container 202 may be fitted with a gas inlet line 216 which itself has a gas filtration media 218 attached thereto as previously explained in accordance with FIG. 1. In embodiment 200 of FIG. 2, a plurality of light pipes or optical fibers 260 are connected to container 202 so that both quality and level of liquid within container 202 can be determined. For example, the a quality of liquid within container 202 may be determined by spectrometer 234, which may print out quality information as illustrated at 236, or feed quality information to a computer 238. Simultaneously, liquid level data may be obtained by a light receptor 250, which may be attached optically to all light pipes or optical fibers 260. Information for light receptor 250 is fed via means 252 into computer 238. Optionally, liquid level may be viewed through human vision as depicted at 262. Quality determination may also be determined by human vision. Preferably, the outputs of light receptor 250 and spectrometer 234 are fed through computer 238 which produces monitoring and/or control outputs 254 as selected by the user.

Figure 3:
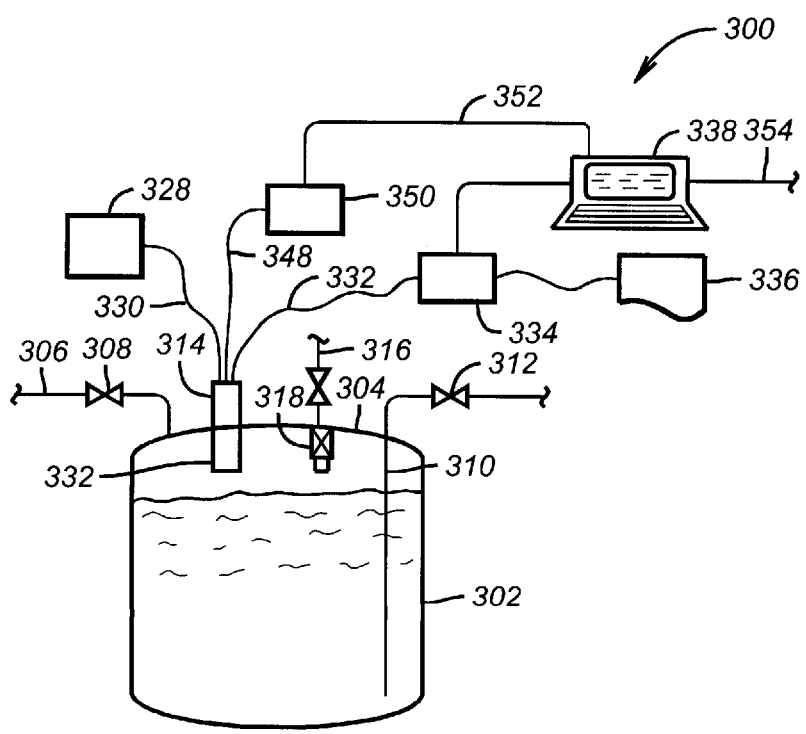
FIG. 3 illustrates, in schematic side-cross-section, a third container embodiment of the invention.

FIG. 3 illustrates another embodiment of an apparatus in accordance with the present invention, illustrating a container 302 having liquid chemical inlet conduit 306 and control valve 308, and liquid chemical outlet conduit 310 and control valve 312. An optional gas inlet conduit 316 is illustrated, as well as optional gas filtration media cartridge 318. Container 302 has a top 304, through which an optical member 314 protrudes. While this is similar to the embodiment 100 in FIG. 1, note that distal end 322 does not protrude into or contact liquid within container 302. Optical member 314 is connected via optical fiber 330 to a light source 328. Light that is transmitted or reflected through optical member 314 indicating liquid level is transmitted through an optical fiber 348 into light receptor 350, which may have an output via connection 352 to computer 338. Simultaneously, quality determination of liquid within container 302 may be obtained through optical fiber 332 connected to spectrometer 334. The output of the spectrometer may either be to computer 338 or a printout at 336. Computer 338 may have one or more outputs 354 as described herein.

In the simplest embodiment, as illustrated in FIG. 1, a commercially available fiber optic transmission sensor probe can be attached at or near the top of the container. Axiom Analytical, Inc., of Irvine, Calif., manufactures fiber-optically coupled single-pass transmission, attenuated total reflectance, and diffuse reflectance probes which can be used in these applications. The probe can be easily optically connected to a spectrometer by means of fiber optics or other light transporting means such as light pipes. The most convenient of spectrometers is to use what is known in the art as a "PC card" spectrometer. Two manufactures of PC card spectrometers are Ocean Optics, Inc. of Dunedin, Fla., and Control Development, Inc. of South Bend, Ind.

Alternatively, as illustrated in FIG. 2, optical fibers can be attached to the sides of the container; only in this case, one monitors not only light intensity, but also spectral profile via a spectrometer in order to assess quality of the chemical. One can then easily use the fiber optic closest to the bottom of the container to perform the spectral analysis of the chemical within. This way, fiber optics provides level sensing (via total intensity monitoring) and quality control monitoring (via spectral profile analysis).

In the third embodiment, as illustrated in FIG. 3, an arrangement minimizing the number of optical ports in the container is presented. The same fiber is used both for level monitoring and spectral analysis monitoring. In this embodiment, a light source propagates substantially perpendicular to the liquid surface. Since density of liquid is so much greater than vapor, and the amount of vapor pressure of many organometallic compounds is so low, the light absorption characteristics of the vapor are negligible to that of the liquid. The effective path length for absorption is defined by depth of liquid. Hence, the amount of absorption relates to liquid level in the container. One only needs to identify appropriate wavelength(s) characteristics of the compound of interest and correlate liquid depth to absorption. As absorption may be quite strong, proper wavelength selection is preferably off of center to main absorption bands.

Further spectral analysis as to "color" of liquid chemical is best evaluated by examining a ratio of absorption intensities at different wavelengths. As discussed herein, impurities in certain organometallic compounds can cause color and/or turbidity to change and this information can be monitored by examining the spectral profile of the compound.

As of today, there are currently no known liquid chemical delivery systems, inside or outside of the semiconductor manufacturing industry, that have any purity monitoring capabilities, and yet chemical purity demands in many industries such as the semiconductor manufacturing industry are extremely high with the reactive nature of the chemicals used.

In particular, it is known that some chemicals such as transition metal complexes exhibit color which can change depending upon the purity of the chemical. By using fiber optical monitoring techniques of the invention, the color and hence the purity of such chemicals can be easily monitored at the same time that the liquid level in such a container is monitored.

Today, fiber optic sensors are already used on chemical containers which deliver chemicals to semiconductor manufacturing processes; however, the fiber optics are not designed and are only partially used in the sense that only the intensity of total light is monitored to indicate whether a liquid level is above or below that point where the fiber is installed.

In summary, the present invention improves the art of liquid chemical delivery by implementing fiber optic sensor monitoring to chemicals such as organometallic compounds and other compounds. What is important to realize is that fiber optics commonly used in liquid delivery systems can be utilized not only for liquid level determination, but also to determine at least one other property, such as purity of the liquid chemical being used, the presence or absence of flame within the container, or such other hazardous situations.

Preferred processes and apparatus for practicing the present invention have been described. It will be understood and readily apparent to the skilled artisan that many changes and modifications may be made to the above-described embodiments without departing from the scope of the present invention. The foregoing is illustrative only, and other embodiments of the processes and apparatus may be employed without departing from the scope of the invention defined in the following claims.

What is claimed is:

1. A liquid chemical container apparatus for dispensing liquid chemical, the apparatus allowing measurement of both concentration and amount of a liquid chemical in the liquid chemical container, the apparatus comprising:

(a) a container body having an optical member optically connected to said container body, the optical member having a distal end and a proximal end, the distal end adapted to extend into the liquid chemical contained in the container body;

(b) a light source optically connected to said optical member, said light source able to transmit light through the optical member;

(c) a light receptor optically connected to said optical member, said light receptor able to receive light reflected from said liquid chemical, said light reflected from said liquid chemical being transmitted through said optical member; and (d) means for optical discrimination between liquid chemical of different optical properties, said means for optical discrimination optically connected to said optical member.

2. The apparatus of claim 1 wherein said optical member is an optical fiber transmission/reflection probe.

3. The apparatus of claim 1 wherein said means for optical discrimination is selected from a group consisting of human vision and machine vision.

4. The apparatus of claim 3 wherein said machine vision is a spectrometer.

5. An apparatus for dispensing liquid chemical, the apparatus allowing measurement of both concentration and amount of a liquid chemical in the liquid chemical container, the apparatus comprising:

(a) a container body having a plurality of optical members connected to said container body, said plurality of optical members allowing optical access to liquid chemical contained within said container body, the plurality of optical members positioned on said container body in a fashion so that a user may determine the presence or absence of said liquid chemical at the points where each of said plurality of optical members is positioned; and (b) means for optical discrimination between liquid chemical of different optical properties, said means for optical discrimination connected to at least one of said plurality of optical members.

6. The apparatus of claim 5 wherein said means for optical discrimination is selected from a group consisting of human vision and machine vision.

7. The apparatus of claim 6 wherein said machine vision is a spectrometer.

8. A liquid chemical container apparatus for dispensing liquid chemical, the apparatus allowing measurement of both concentration and amount of a liquid chemical in the liquid chemical container, the apparatus comprising:

(a) an optical member optically connected to said container body, the optical member having a distal end and a proximal end, the distal end adapted to extend into the container body but not touching liquid chemical contained in the container body;

(b) a light source optically connected to said optical member, said light source able to transmit light through the optical member;

(c) a light receptor optically connected to said optical member, said light receptor able to receive light reflected from said liquid chemical, said light reflected from said liquid chemical being transmitted through said optical member; and (d) means for optical discrimination between liquid chemical of different properties, said means for optical discrimination optically connected to said optical member.

9. Apparatus in accordance with claim 8 wherein said means for optical discrimination is selected from a croup consisting of human vision and machine vision.

10. The apparatus of claim 9 wherein said machine vision is a spectrometer.

* * * * *

UNITED STATES PATENT AND TRADEMARK OFFICE
CERTIFICATE OF CORRECTION

| | | |
|---|---|---|
| PATENT NO. | : 6,543,493 B2 | |
| DATED | : April 8, 2003 | |
| INVENTOR(S) | : Gregory M. Jursich and Kevin Sirk | |

It is certified that error appears in the above-identified patent and that said Letters Patent is hereby corrected as shown below:

Column 10,
Line 20, please delete the word "croup" and replace it with the word -- group --.

Signed and Sealed this

Twenty-sixth Day of August, 2003

JAMES E. ROGAN
*Director of the United States Patent and Trademark Office*